United States Patent [19]
Mussmann et al.

[11] Patent Number: 6,080,375
[45] Date of Patent: Jun. 27, 2000

[54] EXHAUST GAS PURIFICATION CATALYST WITH IMPROVED HYDROCARBON CONVERSION

[75] Inventors: Lothar Mussmann, Offenbach; Dieter Lindner, Hanau; Renee Van Yperen, Loenen a/d Vecht; Egbert Lox, Hanau; Thomas Kreuzer, Karben, all of Germany

[73] Assignee: Degussa Aktiengesellscaft, Frankfurt, Germany

[21] Appl. No.: 08/967,984

[22] Filed: Nov. 12, 1997

[30] Foreign Application Priority Data

Nov. 11, 1996 [DE] Germany ............ 196 46 297
Oct. 4, 1997 [DE] Germany ............ 197 43 850

[51] Int. Cl.⁷ .................. B01J 8/02; B01J 29/08; B01J 29/40
[52] U.S. Cl. .............. 423/213.5; 423/212; 423/213.2; 423/239.2; 502/64; 502/66; 502/67; 502/74; 502/325; 502/339
[58] Field of Search ................. 502/64, 66, 67, 502/325, 339, 74; 423/212, 213.2, 213.5, 239.2

[56] References Cited

U.S. PATENT DOCUMENTS

| | | | |
|---|---|---|---|
| 5,177,041 | 1/1993 | Horiuchi et al. | 502/66 |
| 5,292,696 | 3/1994 | Ito et al. | 502/66 |
| 5,376,610 | 12/1994 | Takahata et al. | 502/66 |
| 5,407,880 | 4/1995 | Ikeda et al. | 502/67 |
| 5,795,840 | 8/1998 | Takami et al. | 502/327 |

FOREIGN PATENT DOCUMENTS

| | | | |
|---|---|---|---|
| 0 485 180 A1 | 5/1992 | European Pat. Off. | B01D 53/36 |
| 0 782 880 A1 | 7/1997 | European Pat. Off. | B01D 53/94 |
| 42 39 875 A1 | 6/1994 | Germany | B01D 53/36 |
| WO 07/22404 | 6/1997 | WIPO | B01D 53/94 |

*Primary Examiner*—Tom Dunn
*Attorney, Agent, or Firm*—Smith Gambrell & Russell, LLP

[57] ABSTRACT

An exhaust gas purification catalyst with improved hydrocarbon conversion is disclosed, which contains metals from the platinum group as its catalytically active components. Two superposed functional layers are applied to one support. The catalyst has a first functional layer with a mixture of a first catalyst with at least one zeolite and the second functional layer applied to the first functional layer which contains a mixture of a second catalyst and at least one zeolite. The zeolites exhibit a molar ratio of silicon dioxide/aluminum oxide of more than 40 and in that at least palladium and rhodium are present as the platinum group metals and are each contained separately from one another in only one of the two catalysts. The catalyst is distinguished by particularly good suppression of hydrocarbon emissions during cold-starting and exhibits particularly good long-term stability.

28 Claims, No Drawings

EXHAUST GAS PURIFICATION CATALYST WITH IMPROVED HYDROCARBON CONVERSION

INTRODUCTION AND BACKGROUND

The invention relates to an exhaust gas purification catalyst with improved hydrocarbon conversion, which contains metals from the platinum group as its catalytically active components and comprises two superposed functional layers applied to a support. Another aspect of the invention relates to the manufacture and production of the catalyst. Still another aspect of the invention involves the treatment of exhaust gases with the catalyst.

Internal combustion engines emit pollutants, which have to be converted into harmless compounds by suitable exhaust gas purification catalysts. The main pollutants are carbon monoxide, nitrogen oxides and unburned hydrocarbons. They may be converted into water, carbon dioxide and nitrogen by catalysts containing metals from the platinum group. The different types of catalyst are three-way catalysts, oxidation catalysts and reduction catalysts. The boundary between these catalysts is not fixed and depends in particular on the composition of the exhaust gas.

Three-way catalysts are capable of converting all three of the above-mentioned pollutants at the same time under stoichiometric exhaust gas conditions. The nitrogen oxides are reduced to nitrogen with simultaneous oxidation of carbon monoxide and hydrocarbons. As their essential catalytic component, three-way catalysts contain rhodium combined with platinum and/or palladium. A catalyst of this type containing rhodium and palladium is described in DE 38 35 184 C2, for example. The presence of rhodium in the three-way catalyst is important for its reducing function. Catalysts which contain only platinum and/or palladium have only an unsatisfactory reductive effect and are therefore used predominantly as oxidation catalysts. When they have reached their operating temperature, modern three-way and oxidation catalysts are capable of converting the pollutants concerned into harmless products at rates of more than 70%. However, a significant problem is still the cold-starting of internal combustion engines. During the so-called cold-start phase, which covers approximately the first 100 seconds after the engine is started, the exhaust gas purification catalyst is still cold and therefore inactive. As the exhaust gas temperature rises the catalyst warms up. The increasing pollutant conversion activity of the catalyst is characterized by the light-off temperature of the respective pollutant. This is the temperature at which the pollutant concerned is 50% converted. The light-off temperatures of modern catalysts range from 200 to 400° C.

The main pollutant components during the cold-start phase are unburned hydrocarbons. Various testing methods have been developed to assess the purification effect of exhaust gas purification catalysts. One testing method which is frequently used is the so-called FTP 75 test, which was developed in the USA. In Europe the standard testing method is the ECE testing method.

The FTP 75 test extends over a period of 2500 seconds after an internal combustion engine is cold-started and is subdivided into three stages. The pollutants emitted during these three stages are collected in three bags and are then analyzed. The first stage covers the real cold-start phase and is concluded after 500 seconds. The following two stages simulate varying load conditions and a warm start.

For the ultimate assessment of an exhaust gas purification system, which may consist of several catalysts and adsorbers, the pollutants collected in all three bags are evaluated. It has been shown that substantial improvements in the overall assessment may be obtained in particular by improvements in pollutant conversion during the cold start phase. The conversion rates of the catalysts at their operating temperature allow at most only slight improvements, which are barely able to influence the overall assessment made according to the FTP 75 testing method. Thus, an internal combustion engine emits during the first 100 seconds after a cold start approximately two thirds of the total amount of hydrocarbons emitted during the FTP 75 test.

To reduce these hydrocarbon emissions, various combinations of hydrocarbon adsorbers and catalysts have been proposed.

U.S. Pat. No. 5,078,979 describes a method of exhaust gas purification in which the exhaust gas is firstly conveyed through a hydrocarbon adsorber and then through a catalyst. The hydrocarbons contained in the cold exhaust gas are adsorbed by the adsorber until the latter has reached a temperature of approximately 150° C. Above this temperature the hydrocarbons begin to desorb again from the adsorber and are converted by the catalyst, which is warmer by then, into harmless products. Suggested adsorbers are molecular sieves (zeolites), which adsorb the hydrocarbons preferentially over water vapor which is also contained in the exhaust gas and exhibit high temperature stability.

A disadvantage of such a system is the fact that the adsorber itself takes heat from the exhaust gas during the warming-up phase, which is then unavailable to the catalyst connected downstream, such that the latter is slower to heat up than when no adsorber is connected upstream. Although combining a spatially separate adsorber and catalyst reduces the emission of hydrocarbons during the cold start phase, such an arrangement performs less well in the overall assessment according to the FTP 75 testing method than a single three-way catalyst, since the hydrocarbons adsorbed first are desorbed once the desorption temperature is exceeded and pass through the still insufficiently active catalyst to a considerable extent without being converted into harmless components.

To improve this situation, DE 42 39 875 A1 proposed the combination of an oxidation catalyst with a hydrocarbon adsorber on one support. Oxidation catalysts and hydrocarbon adsorbers are applied to the support in the form of superposed coatings, wherein the adsorber coating lies on the catalyst coating and comes into direct contact with the exhaust gas.

The oxidation catalyst contains platinum and/or palladium as catalytically active components. The adsorber contains a mixture of a dealuminized Y-zeolite and a zeolite ZSM5, wherein the Y-zeolite exhibits an Si/Al ratio greater than 40 and the zeolite ZSM5 exhibits an Si/Al ratio greater than 20.

EP 0 716 877 A1 likewise proposes the combination of a hydrocarbon adsorber with a catalyst in the form of two superposed coatings. The catalyst coating lies on the adsorber coating and contains as its catalytically active components one or more platinum group metals from the group comprising platinum, palladium, rhodium, ruthenium and iridium on aluminum oxide, cerium oxide and zirconium oxide. A zeolite with a weight ratio of silicon dioxide to aluminum oxide of more than 300 is used as the adsorber material. A monolithic honeycomb body of cordierite with parallel flow channels for the exhaust gas acts as the support. The adsorber coating is applied as a first layer directly onto the inner wall surfaces of the flow channels. Because of the poor adhesion of zeolite coatings to this substrate, the adsorber layer contains, in addition to zeolite, the same amount of colloidal silicon dioxide as a binder. Owing to this high content of colloidal material, the risk arises that the pores of the zeolite will become partially blocked and its adsorption capacity will therefore be impaired.

The solutions proposed are unsatisfactory from the point of view of their hydrocarbon suppression over all three stages of the FTP 75 test. The hydrocarbon adsorption during the first stage is adequate, but there are shortcomings in the dynamic pollutant conversion during stages 2 and 3 of the FTP 75 test. In particular, the ageing stability of the pollutant conversion is also unsatisfactory.

SUGARY OF THE INVENTION

An object of the present invention is therefore to provide an exhaust gas purification catalyst which exhibits improved hydrocarbon suppression over all three stages of the FTP 75 test procedure while at the same time exhibiting improved ageing stability.

The above as well as other objects of the invention are achieved by an exhaust gas purification catalyst which contains metals from the platinum group as its catalytically active components and comprises two superposed functional layers applied to a support. The exhaust gas purification catalyst is characterized in that the first functional layer comprises a mixture of a first catalyst with at least one zeolite and the second functional layer applied to the first functional layer comprises a mixture of a second catalyst and at least one zeolite, wherein the zeolites exhibit a molar ratio of silicon dioxide/aluminum oxide of more than 40 and in that at least palladium and rhodium are present as the platinum group metals and are each contained separately from one another in only one of the two catalysts. Another feature of the invention resides in the production and manufacture of the above described catalyst by providing the first functional layer on the support and depositing the second functional layer upon the first functional layer in such a manner that the second functional layer overlies the first functional layer. Another feature of the invention resides in the treatment of exhaust gases with the above catalyst by passing exhaust gas over, through or around the catalyst in such a manner that the exhaust gas contacts the catalyst.

In the context of this invention, the functional layer should be understood to be a coating which has a particular effect on the exhaust gas. This may be the adsorption of pollutant components or a catalytic effect or a combination of the two. For the purpose of adsorption of the hydrocarbons, both functional layers of the exhaust gas purification catalyst contain at least one zeolite with a molar ratio of silicon dioxide/aluminum oxide of more than 40. The adsorber material of the functional layers does not itself comprise any catalytically active noble metal component, but rather is mixed with a catalyst. The adsorber effect and catalyst effect are thus spatially closely adjacent in the functional layers and thereby ensure optimum conversion of the hydrocarbons which are desorbed again as the exhaust gas temperature increases. In the exhaust gas purification catalyst according to the invention, therefore, the zeolites functioning as adsorbers do not exhibit any catalytically active components at their specific surface. In this way, it is possible to avoid the coking of the zeolites which is otherwise frequently noted.

The two catalysts in the functional layers exhibit different catalytic effects. While the one catalyst displays a substantially oxidative effect owing to the use of palladium and optionally platinum, the catalyst of the other functional layer exhibits a reductive effect owing to the use of rhodium and optionally platinum. By arranging the two catalysts in different layers, palladium and rhodium are spaced apart from each other. In this way, the formation of an alloy of palladium and rhodium at high exhaust gas temperatures and the impairment of catalytic activity which alloy formation entails are prevented.

The reduction catalyst containing rhodium may be accommodated either in the first functional layer or in the second functional layer lying thereon, while the oxidation catalyst containing palladium is arranged in the respective other layer. However, it is preferable for the reduction catalyst to be introduced into the second functional layer, which comes directly into contact with the exhaust gas. In this way, the reduction catalyst may effect optimum conversion of the nitrogen oxides contained in the exhaust gas, wherein the carbon monoxide contained in the exhaust gas and the hydrocarbons as well as the hydrocarbons desorbed again during heating-up of the adsorber material act as reduction agents.

The catalysts in the functional layers may comprise other noble metals of the platinum group (Group VIII of the periodic table) in addition to palladium, rhodium and platinum. Platinum group metals comprise ruthenium, rhodium, palladium, osmium, iridium and platinum. The catalysts contain active aluminum oxide as the support for the platinum group metals. Active aluminum oxide may be understood to be aluminum oxides with specific surfaces (measured according to DIN 66 132) of more than 10 $m^2/g$. They comprise various crystal structures (gamma-, delta-, theta-, kappa- and eta-aluminum oxide), which, when heated to over 1150 K, are converted into thermally stable alpha-aluminum oxide (c.f. Ullmann's Encyclopedia of Industrial Chemistry; 5th Edition; 1985; Vol. A1, 561–562).

The catalytically active platinum group metals are applied to the active aluminum oxide in a concentration of from 0.1 to 10 wt. % based on the total weight of the respective catalyst. To this end, in a separate production step the active aluminum oxide is impregnated with soluble precursors of the respective metals, dried and calcined. After this production step, the platinum group metals are present on the aluminum oxide in a highly disperse form. Both catalysts may additionally contain active aluminum oxide, cerium oxide and/or zirconium oxide free of platinum group metals in an amount of from 0 to 90 wt. %, based on the total weight of the respective catalyst.

The preferred weight ratio between the respective catalyst in one functional layer and the zeolites contained therein is 3:1. However, the weight ratio may be varied within the range of 1:5 to 5:1 to optimize the catalytic effect of the exhaust gas purification catalyst.

The adsorber materials used are zeolites with molar ratios greater than 40. Owing to this high molar ratio, the zeolites adsorb hydrocarbons preferentially over water and exhibit a high temperature stability. It is preferable to use a zeolite ZSM5 with a molar ratio greater than 40 in the first functional layer and a dealuminized Y-zeolite with a molar ratio greater than 100 in the second functional layer. Ceramic or metallic foams with an open-cell pore structure or ceramic or metallic honeycomb bodies with parallel flow channels for the exhaust gas may be used as the support for the exhaust gas purification catalyst. These supports are the ones generally used as supports for automobile exhaust gas catalysts. These supports are coated with the two functional layers by known methods. To this end, first of all an aqueous coating dispersion is prepared from the relevant functional layer components provided. Coating of this support may be effected, for example, by pouring this coating dispersion thereover or by immersion in this dispersion. When any flow paths or channels which may have become closed have been blown free, the support is dried and then calcined at temperatures of up 500° C. The particular methods to be applied here are known to the person skilled in the art.

The functional layers are each applied to the support in a concentration of from 10 to 300 grams per liter of support volume.

The exhaust gas purification catalyst according to the invention may be used alone or in combination with other catalysts in the exhaust gas purification systems of internal combustion engines.

To explain the invention, various exhaust gas purification catalysts were produced on ceramic supports. The supports were honeycomb bodies of cordierite with a cell density (number of flow channels per cross-sectional area) of 62 $cm^{-2}$, a diameter of 11.84 cm, a length of 15.24 cm and a flow channel wall thickness of 0.2 mm. The volume of the support was thus 1.68 l.

The purification action of the catalysts was determined by means of the FTP 75 testing method using a 1994-model motor vehicle with 4 cylinders and a 2 l piston capacity. The ratio of the installed catalyst volume to the piston capacity of the motor vehicle was 0.84.

The gas samples for the FTP 75 test were taken from the exhaust gas system downstream of the test piece.

EXAMPLES

Comparative Example 1

A single layer with the following composition was applied to the honeycomb body:
20 g/l La/Al$_2$O$_3$ γ-aluminum oxide, stabilized with 2 to 4 wt. % lanthanum, calculated as lanthanum oxide
50 g/l La/Al$_2$O$_3$ stabilized γ-aluminum oxide with palladium and rhodium prefixed thereon in a weight ratio of 14:1 and a concentration of 7 wt. %, based on the total weight of the aluminum oxide plus palladium and rhodium
25 g/l cerium/zirconium mixed oxide (75 wt. % cerium oxide, 25 wt. % zirconium oxide)
25 g/l cerium oxide from the acetate
18 g/l zirconium oxide from the acetate
30 g/l dealuminized Y-zeolite (molar ratio≧200)
30 g/l zeolite ZSM5 (molar ratio≧120)

The total loading of the honeycomb body was thus 198 g/l, of which 3.5 g/l were apportioned to palladium and rhodium.

To prefix palladium and rhodium on part of the stabilized aluminum oxide, the amount of aluminum oxide provided was impregnated with an aqueous solution of rhodium nitrate and palladium nitrate, dried at 120° C. and then calcined for a period of 4 hours at 500° C.

The powder thus obtained was dispersed in water for the purpose of preparing a coating dispersion with the other components of the catalyst and homogenized by grinding. After grinding, the average particle size of the solids of the coating dispersion was approximately 6 μm. The solids content of the coating dispersion was 50 wt. %.

The honeycomb body was coated by immersion in the coating dispersion, dried for 10 minutes at 120° C. and then calcined for 4 hours at 300° C.

Comparative Example 2

A single layer with substantially the same composition as in Comparative Example 1 was applied to a second honeycomb body. In contrast to Comparative Example 1, only palladium was prefixed on the aluminum oxide. Only after coating was the required amount of rhodium introduced into the coating by immersion of the honeycomb body in an impregnating solution containing rhodium nitrate. To avoid direct contact between the rhodium and the prefixed palladium, sol of zirconium oxide was added to the impregnating solution to complex the rhodium. The finished impregnated solution contained 9 wt. % of rhodium nitrate and 30 wt. % of zirconium oxide sol, each based on the total weight of the impregnating solution. After impregnation, the catalyst was dried for 6 hours at 120° C. and then calcined for 2 hours at 500° C.

EXAMPLE

To produce an exhaust gas purification catalyst according to the invention, two layers with the following compositions were applied successively to a further honeycomb body:

1. Layer: (directly on the honeycomb body)
60 g/l La/Al$_2$O$_3$ stabilized aluminum oxide with palladium prefixed thereon in a concentration of 5.45 wt. %
15 g/l cerium/zirconium mixed oxide (75/25)
15 g/l cerium oxide from the acetate
15 g/l zirconium oxide from the acetate
30 g/l zeolite ZSM5 (molar ratio≧120)

2. Layer
10 g/l La/Al$_2$O$_3$ stabilized aluminum oxide with rhodium prefixed thereon in a concentration of 2.3 wt. %
15 g/l cerium/zirconium mixed oxide (75/25)
15 g/l La/Al$_2$O$_3$
30 g/l dealuminized Y-zeolite (molar ratio≧200)

The total loading of the honeycomb body was thus 205 g/l, of which 3.5 g/l were apportioned to palladium and rhodium.

Comparative Example 3

A further honeycomb body was provided with a double layer as in the Example according to the invention. However, the zeolites were replaced by increasing the other coating components proportionately.

1. Layer: (directly on the honeycomb body)
77 g/l La/Al$_2$O$_3$ stabilized aluminum oxide with palladium prefixed thereon in a concentration of 4.25 wt. %
19 g/l cerium/zirconium mixed oxide (75/25)
19 g/l cerium oxide from the acetate
19 g/l zirconium oxide from the acetate 2. Layer
18 g/l La/Al$_2$O$_3$ stabilized aluminum oxide with Rh (1.28 wt. %) prefixed thereon
26 g/l cerium/zirconium mixed oxide (75/25)
26 g/l La/Al$_2$O$_3$ The total loading of the honeycomb body was thus 204 g/l, of which 3.5 g/l were apportioned to palladium and rhodium.

Examples of Use

The following catalysts were checked with respect to their purification efficiency:
1. catalyst according to Comparative Example 1
2. catalyst according to Comparative Example 2
3. catalyst according to the Example
4. catalyst according to Comparative Example 3

The results of the FTP 75 test are listed in the following Table. Prior to testing, the catalysts were aged at an exhaust gas temperature of 850° C. at the engine for a period of 50 hours.

| Exhaust gas purification catalyst | Hydrocarbons in bag 1 [g/mile] | Total hydrocarbons (all 3 bags) [g/mile] |
| --- | --- | --- |
| Comparative Ex. 1 | 0.69 | 0.19 |
| Comparative Ex. 2 | 0.6 | 0.17 |
| Comparative Ex. 3 | 0.76 | 0.18 |
| Example | 0.5 | 0.12 |

As these results show, the catalyst according to the invention exhibits the best pollutant conversion. This good result is achieved by using zeolites in both layers and by the spatial separation of palladium and rhodium by accommodating them in two different layers. Moreover, the coating comprising the catalyst according to the invention exhibits good adhesion to the honeycomb body without using colloidal silicon dioxide as a binder material. The good adhesive strength of the catalyst according to the invention results from mixing the zeolite material of the first layer with other active layer components (La/Al$_2$O$_3$, cerium/zirconium mixed oxide, cerium oxide, zirconium oxide).

Further variations and modifications of the above disclosed invention will be apparent to one skilled in the art. These variations and modifications are intended to be encompassed by the preceding disclosure. The invention is in no way intended to be limited by the preceding examples or the claims appended hereto.

German priority documents DE 196 46 297.5 and DE 197 43 850.4 are relied upon and incorporated herein by reference.

We claim:

1. An exhaust gas purification catalyst with improved hydrocarbon conversion comprising:
   a first functional layer, and
   a second functional layer,
   said second functional layer overlying the first functional layer,
   wherein the first functional layer comprises a mixture of a first catalyst comprising palladium and a first zeolite,
   wherein the second functional layer comprises a mixture of a second catalyst comprising rhodium and a second zeolite,
   wherein the first functional layer does not contain rhodium and the second functional layer does not contain palladium and
   wherein the first zeolite and the second zeolite are the same or different and do not contain any catalytically active noble metal component and exhibit a molar ratio of silicon dioxide to aluminum oxide of more than 40.

2. The exhaust gas purification catalyst of claim 1 wherein the first catalyst comprises palladium on an active aluminum oxide and
   the second catalyst comprises rhodium on an active aluminum oxide,
   wherein the concentration of the metals from the platinum group on the active aluminum oxides is from 0.1 to 10% by weight based on the total weight of the respective catalyst.

3. The exhaust gas purification catalyst of claim 2 wherein the first catalyst and second catalyst further comprise a member selected from the group consisting of active aluminum oxide, cerium oxide, zirconium oxide and combinations thereof wherein the member is free of platinum group metals and is present in an amount up to 90% by weight based on the total weight of the respective catalyst.

4. The exhaust gas purification catalyst of claim 3 wherein the first zeolite is a ZSM5 zeolite and wherein the second zeolite is a dealuminized Y-zeolite with a molar ratio of greater than 100.

5. The exhaust gas purification catalyst of claim 4 further comprising a ceramic or metallic foam with an open-cell pore structure with inner wall surfaces and forming a support volume or a ceramic or metallic honeycomb body with parallel flow channels for the exhaust gas, the flow channels having inner wall surfaces and forming a support volume,
   wherein the inner wall surfaces are coated with the catalyst of claim 4 in a concentration of from 10 to 300 grams per liter of support volume for each of the two functional layers.

6. The exhaust gas purification catalyst of claim 5 wherein the weight ratio of the catalyst and the zeolite for each functional layer is from 1:5 to 5:1.

7. A method of reducing exhaust emissions from internal combustion engines comprising:
   passing an exhaust gas from an internal combustion engine in contact with the exhaust purification catalyst of claim 5.

8. A method of producing the exhaust purification catalyst of claim 5 comprising:
   providing the first functional layer and
   depositing a second functional layer overlying the first functional layer.

9. The method of producing the exhaust purification catalyst of claim 8 further comprising the step of
   coating the support with the first functional layer.

10. The exhaust gas purification catalyst of claim 3 wherein the weight ratio of the catalyst and the zeolite for each functional layer is from 1:5 to 5:1.

11. A method of reducing exhaust emissions from internal combustion engines comprising:
    passing an exhaust gas from an internal combustion engine in contact with the exhaust purification catalyst of claim 3.

12. A method of producing the exhaust purification catalyst of claim 3 comprising:
    providing the first functional layer and
    depositing a second functional layer overlying the first functional layer.

13. The exhaust gas purification catalyst of claim 1 wherein the weight ratio of the catalyst and the zeolite for each functional layer is from 1:5 to 5:1.

14. A method of reducing exhaust emissions from internal combustion engines comprising:
    passing an exhaust gas from an internal combustion engine in contact with the exhaust purification catalyst of claim 1.

15. A method of producing the exhaust purification catalyst of claim 1 comprising:
    providing the first functional layer and
    depositing a second functional layer overlying the first functional layer.

16. An exhaust gas purification catalyst with improved hydrocarbon conversion comprising:
    a first functional layer, and
    a second functional layer, said second functional layer overlying the first functional layer, wherein the first functional layer comprises a mixture of a first catalyst comprising palladium and a first zeolite, wherein the second functional layer comprises a mixture of a second catalyst comprising rhodium and a second zeolite, wherein the first functional layer does not contain rhodium and the second functional layer does not contain palladium and wherein the first zeolite does not contain any catalytically active noble metal component and exhibits a molar ratio of silicon dioxide to aluminum oxide of more than 40 and the second zeolite does not contain any catalytically active noble metal component and is a Y-type zeolite exhibiting a molar ratio of silicon dioxide to aluminum oxide of more than 100.

17. An exhaust gas purification catalyst with improved hydrocarbon conversion comprising:

a first functional layer, and a second functional layer, said second functional layer overlying the first functional layer, wherein the first functional layer consists essentially of a supported palladium catalyst and a member of the group consisting of active aluminum oxide, cerium oxide, corium/zirconium oxide and zirconium oxide or mixtures thereof and optionally a supported platinum catalyst, mixed with a ZSM5 zeolite exhibiting a molar ratio of silicon dioxide to aluminum oxide of more than 40 and does not contain any catalytically active noble metal component, and wherein the second functional layer consists essentially of a supported rhodium catalyst and a member of the group consisting of active aluminum oxide, cerium oxide, cerium/zirconium oxide and zirconium oxide or mixtures thereof and optionally a supported platinum catalyst, mixed with a dealuminized Y-zeolite exhibiting a molar ratio of silicon dioxide to aluminum oxide of more than 100 and does not contain any catalytically active noble metal component.

18. A double layer exhaust gas purification catalyst which is applied to a support and contains palladium and rhodium separated from each other in a first layer and in a second layer, wherein said first layer comprises a first catalyst containing palladium on an active aluminum oxide, and the first layer further comprises a first zeolite mixed with said first catalyst, and the second layer overlying the first layer comprises a second catalyst containing rhodium on an active aluminum oxide, and the second layer further comprises a second zeolite mixed with said second catalyst, wherein the first and second zeolites are the same or different and do not contain any catalytically active noble metal component and exhibit a molar ratio of silicon dioxide to aluminum oxide of more than 40.

19. The double layer exhaust gas purification catalyst of claim 18, wherein the concentration of palladium and rhodium on the active aluminum oxides is from 0.1 to 10% by weight based on the total weight of the respective catalyst.

20. The double layer exhaust gas purification catalyst of claim 19, wherein said first and second catalysts further comprise a member selected from the group consisting of active aluminum oxide, cerium oxide, zirconium oxide and combinations thereof, and wherein said member is present in an amount up to 90% by weight based on the total weight of the respective catalyst.

21. The double layer exhaust gas purification catalyst of claim 20, wherein said first and/or second catalyst further comprises platinum.

22. The double layer exhaust gas purification catalyst of claim 21, wherein the first zeolite is a ZSM5 zeolite and wherein the second zeolite is a dealuminized Y-zeolite with a molar ratio of silicon dioxide to aluminum oxide of greater than 100.

23. The double layer exhaust gas purification catalyst of claim 22, wherein said support forms a support volume and is selected from a ceramic or metallic foam with an open-cell pore structure with inner wall surfaces or from a ceramic or metallic honeycomb body with parallel flow channels for the exhaust gas, the flow channels having inner wall surfaces, wherein said inner wall surfaces of the pores or flow channels are coated with the first or second catalyst at a concentration of from 10 to 300 grams per liter of support volume for each of the two layers, wherein said first and/or second catalyst further comprises platinum.

24. The double layer exhaust gas purification catalyst of claim 20 wherein the first zeolite is a ZSM5 zeolite and wherein the second zeolite is a dealuminized Y-zeolite with a molar ratio of silicon dioxide to aluminum oxide of greater than 100.

25. The double layer exhaust gas purification catalyst of claim 24 wherein said support forms a support volume and is selected from a ceramic or metallic foam with an open-cell pore structure with inner wall surfaces or from a ceramic or metallic honeycomb body with parallel flow channels for the exhaust gas, the flow channels having inner wall surfaces, wherein said inner wall surfaces of the pores or flow channels are coated with the first or second catalyst at a concentration of from 10 to 300 grams per liter of support volume for each of the two layers, wherein said first and/or second catalyst further comprises platinum.

26. The double layer exhaust gas purification catalyst of claim 18, wherein the weight ratio of said first catalyst and said first zeolite and the weight ratio of said second catalyst and said second zeolite are from 1:5 to 5:1.

27. A method of reducing exhaust emissions from an internal combustion engine that comprises passing an exhaust gas from an internal combustion engine in contact with the double layer exhaust gas purification catalyst of claim 18.

28. A method of producing the double layer exhaust gas purification catalyst of claim 18 that comprises providing said first layer and depositing said second layer overlying the first layer.

* * * * *